Jan. 10, 1956 E. W. LOUDEN ET AL 2,730,256
CONVEYOR TRUCK
Filed June 30, 1953 2 Sheets-Sheet 1

INVENTORS.
EDGAR W. LOUDEN,
WILLIAM K. HOLLERON,
By
Agent

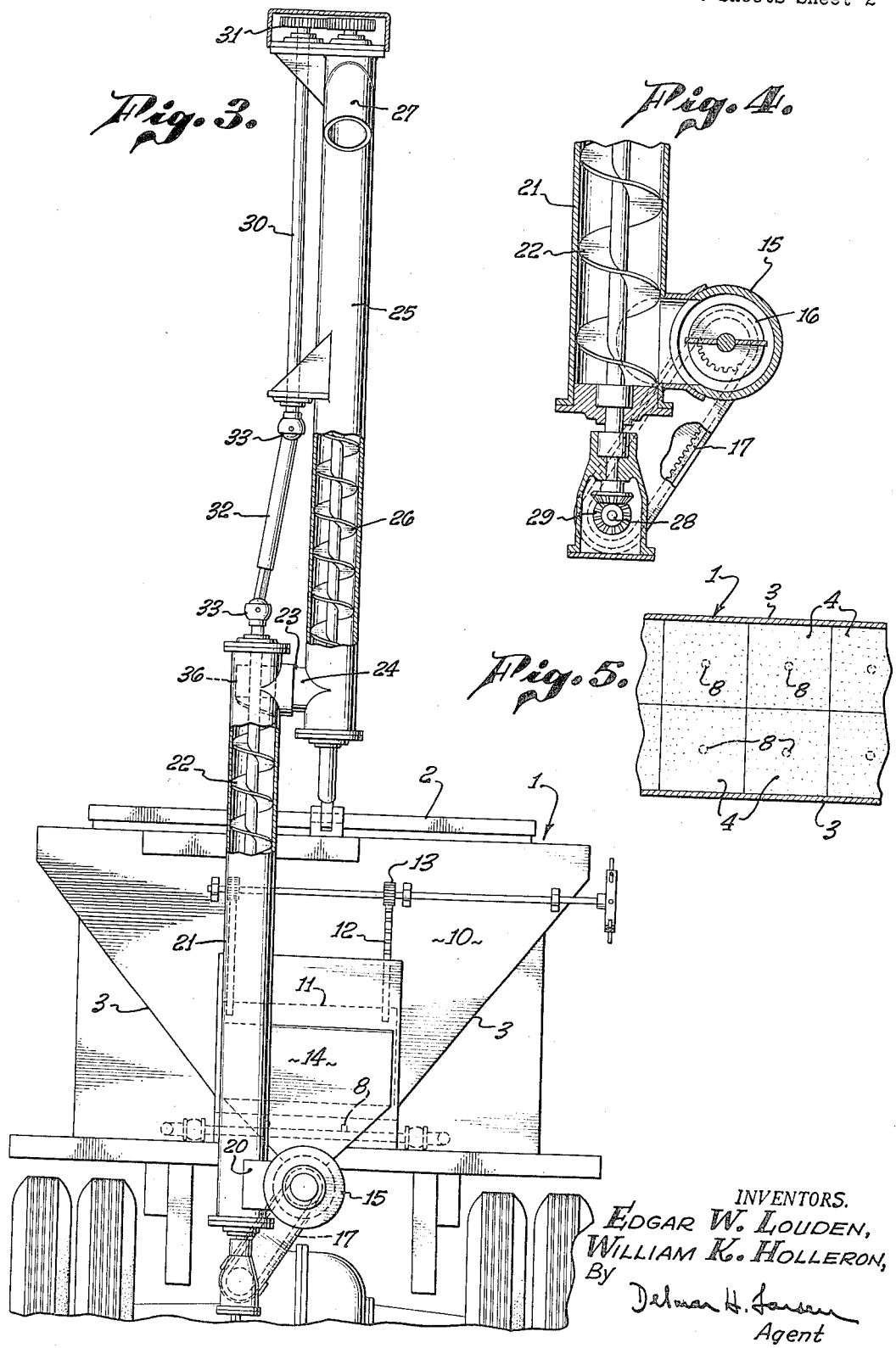

United States Patent Office 2,730,256
Patented Jan. 10, 1956

2,730,256
CONVEYOR TRUCK

Edgar W. Louden and William K. Holleron, Houston, Tex., assignors to National Lead Company, New York, N. Y., a corporation of New Jersey Application June 30, 1953, Serial No. 365,188

1 Claim. (Cl. 214—522)

This invention relates to trucks for conveying and delivering pulverulent material, particularly for finely ground material of high intrinsic density, such as ground barytes.

In the use of weighting materials, particularly ground barytes, and ground hematite, the practice has arisen in recent years of handling these materials in bulk. Conveying equipment adapted for material of lighter density, such as Portland cement, whiting, and even grain and the like, has proved to be unsuited to the bulk handling of weighting materials of the type described. The fundamental cause of the difficulty appears to lie in the combination of great fineness and high density. Commercial drilling mud weighting materials are ground to a fineness of approximately 95% passing 325 mesh, and moreover have a specific gravity in the range of 4.1 to 4.4. This powdery material packs very hard and tightly, particularly when subjected to vibration as is the case when such materials are transported in bulk, for example, by truck.

An object of this invention is to provide a truck for transporting ground weighting materials.

Another object of the invention is to provide such a truck which is capable not only of conveying the bulk material from place to place, but also of discharging it at a point considerably higher than the truck itself.

Another object of the invention is to provide a truck for conveying powdered weighting materials so designed that settling and compaction of the weighting material during transit will not incapacitate the discharge mechanism.

Another object of the invention is to provide a series of screw conveyors in tandem that is free from jamming and packing difficulties.

Other objects of the invention will become apparent as the description thereof proceeds.

In the accompanying drawings,

Figure 3 is a rear view of the truck, and shows the discharge conveyor in its vertical operating position.

Figure 4 is a detail cut-away view from the rear, and is a section across the line 4—4 indicated in Figure 2.

Figure 5 is a plan view showing the construction of the bottom of the interior of the truck.

Figure 1:
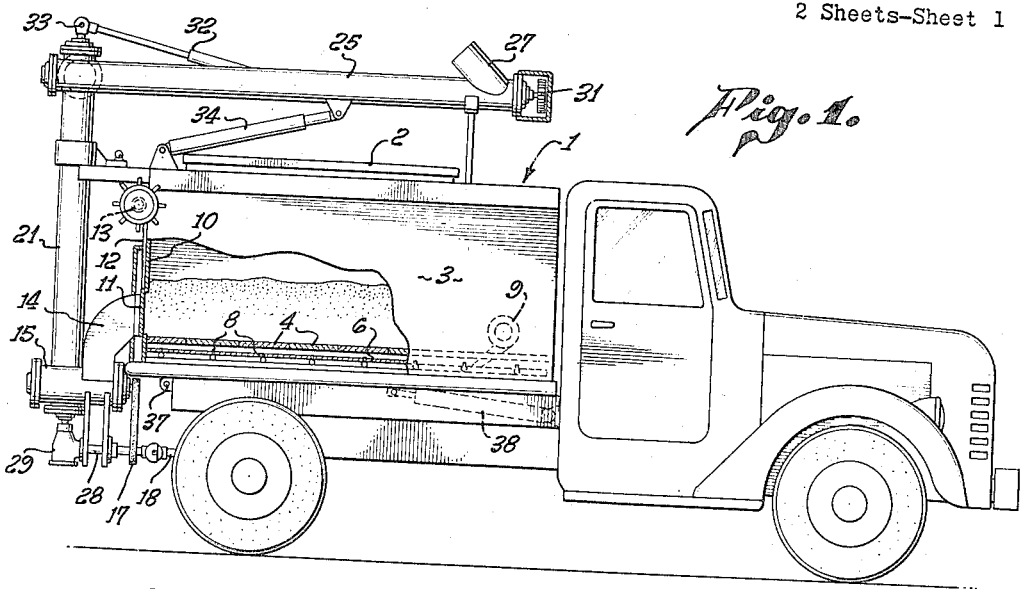
Figure 1 is a side view of the conveying truck, with a portion of the bin cut away to show the detail therein.

The construction and operation of the truck will now be described in detail, having reference first to Figure 1. Figure 1 shows a truck body of ordinary construction as to wheels, frame and cab, on which is mounted a bin 1. This bin may be opened or closed at the top, but we prefer a closed construction with a hatch cover 2 for protection of the contents against rain and loss by blowing. The two ends of the bin are substantially vertical, but the sides 3, particularly as seen in Figure 3, slope inwardly towards the bottom, at an angle which is conveniently from 45° to 65° inclination to the horizontal. Substantially the entire length of the lower portion or bottom of the bin is constituted of porous blocks 4, as may be seen particularly in Figures 1, 2, and 5. These blocks are of such porosity and permeability that powdered weighting material of ordinary commercial fineness will not sift down through the pores, and yet will permit of air being blown upward through the pores; and moreover are of sufficient thickness that they can withstand the loading involved. Conveniently, the blocks may be of sintered aluminum oxide and from 1½ to 2 inches thick, and with such a permeability that six cubic feet of air per minute will be passed per square foot of area at two inches water pressure. Other thicknesses and permeabilities can likewise be used, and indeed other porous media such as a layer of canvas set on a perforated metal plate could likewise be used, but would not be as durable as the porous blocks which we prefer. The individual blocks are set on steel supports 5, which at the same time separate the blocks sufficiently from the separator plate 6 so that an air chamber is formed therebetween. An air header 7, provided with outlets 8, is interposed between plate 6 and the truck bed, as may be seen from Figures 1 and 2, and is fed by a blower 9, depicted in Figure 1. The blower may be of the ordinary type consisting of an electric motor and centrifugal rotor, and for the type of block described, a pressure of about 12 ounces per square inch is satisfactory.

The bin may be raised to a slight angle for discharging by elevation by the hydraulic lift 38, about pivot 37; and indeed it may be left at this angle more or less permanently.

Figure 2:
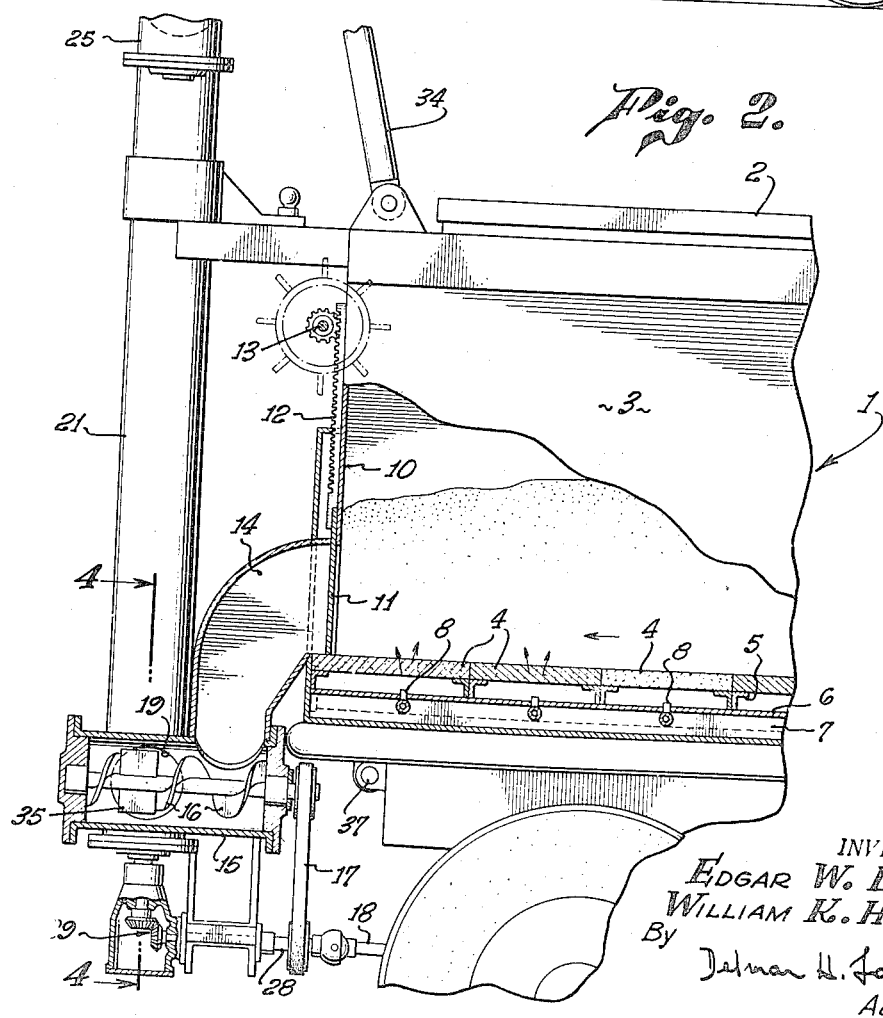
Figure 2 is an enlarged view of the rear portion of the truck as seen in Figure 1, with more parts cut away to show the interior construction thereof.

The bin is terminated on its rearward end by a fixed wall 10, shown in Figures 1, 2, and 3, part of which comprises a sliding gate 11, operated by a rack and pinion mechanism 12 and 13, which makes it possible to raise or lower the gate and thus allow the pulverulent material in the bin to flow out rearwardly into the down-spout 14, shown particularly in Figures 1 and 2. The down-spout 14 is directly connected to a short section of screw conveyor consisting of a housing 15 containing a short length of screw conveyer flight 16, terminating in a kicker paddle 35, as particularly shown in Figure 2. An important feature of the invention is that this screw conveyor 16 is substantially less in its greatest diameter than the inside diameter of the housing 15. For example, an outside diameter of 6 inches for the screw with an inside diameter of 8 inches for the casing has been found particularly suitable. This short horizontal section of screw conveyor is operated by a suitable belt drive 17, shown in Figures 1, 2, and 4, operated by the power take-off of the truck through a telescoping shaft 18, shown particularly in Figures 1 and 2. The material moved horizontally and rearwardly by actuating screw 16 is discharged through a side opening 19 in housing 15, which is formed by the housing 20 shown particularly in Figures 3 and 4. Housing 20 opens into the bottom of a fixed screw conveyor section 21, shown in the first four figures. This section of screw conveyor is of conventional type and has within it a screw 22, shown in Figures 3 and 4. Material transported upwardly by the operation of screw 22 discharges with the aid of kicker paddles 36 through housing 23, shown in Figure 3. Housing 23 is fitted around a slightly smaller housing 24, shown in Figure 3, which leads into the movable screw conveyor portion 25, shown in Figures 1 and 3. The connection of housings 23 and 24 is such that rotation is permitted. The movable screw conveyor 25 has within it a screw 26 again of conventional construction, and shown in part in Figure 3. Material propelled upwardly through screw conveyor portion 25 is discharged with the aid of similar kicker paddles not visible in the drawing shown in Figures 1 and 3.

The drive for the screw of the fixed vertical section of screw conveyor 21 is provided by a shaft 28, as seen in Figures 1 and 2, extending from the power take-off shaft 18 of the truck proper. This shaft is connected to a right angle drive 29 shown in Figures 1, 2, 3, and 4, into which the shaft of the vertical screw conveyor 21 extends. The screw 26 of the movable screw conveyor 25 is driven from its top end by a shaft 30, seen in Figure 3, and gearing 31, shown in Figures 1 and 3. This shaft 30 is connected to the top of the shaft of screw 22 by a telescoping square shaft assembly 32, shown in Figures 1 and 3, and universal joints 33. The upper, movable screw conveyor portion can be lowered into the approximately horizontal position shown in Figure 1, used when the truck is moving, and can be raised into the approximately vertical position shown in Figure 3 for unloading purposes. This raising is accomplished by a hydraulic cylinder assembly 34, shown in Figure 1 and in part in Figure 2.

The operation of the truck is as follows. The bin is filled to any desired level with powdered weighting material, the gate 11 being closed. The hatch cover 2 is replaced, and the truck is then driven to its final destination for unloading. During transit, vibration will have caused the weighting material to have become compacted. Accordingly, preliminary to and during the unloading operation, the blower 9 is actuated, which forces air up through the porous bottom 4 and causes aeration and consequent fluidification of the powdered weighting material particularly in a layer adjacent the bottom. If not already at such angle, the bed is then raised to an angle of from 6 to 10 degrees and gate 11 is then opened the desired amount, whereupon the now fluidified weighting material empties through the down-spout 14 into the horizontal conveyor 15. All of the conveyor screws are actuated simultaneously, and the construction of the horizontal screw conveyor 15 is such that even should the rate of upward travel of the powdered material in the vertical sections of the screw conveyor be retarded, screw conveyor 15 will not have the effect of packing the screw conveyor 21, because of the fact that the screw 16 therein is undersized, and it is able to rotate without a positive displacement of powdered material. Also, should there have been leakage of weighting material during transit which packs off in screw conveyor 15, it is possible to commence rotation of the screw 16 in spite of any such packing, again because of the undersized diameter of screw 16. It will be apparent that gate 11 can be adjusted to give a suitable rate of flow without jamming at any subsequent point for any given rotational speed of the screws and characteristics of the pulverulent weighting material.

We have tried many arrangements of bin discharging mechanisms combined with screw conveying mechanisms, and have found considerable practical difficulties in all those tried with the exception of the present invention. The co-action of fluidification in the bin, a bin bottom inclined downwardly toward the bin discharge, an adustable gate discharge, a slight gravity drop to a screw conveyor flight rotating in a substantially oversized housing, followed by a conventional vertical screw conveyor, is the combination which has led to success in the present arrangement.

It will be apparent that modifications within the broad scope of the invention are contemplated, and the claim should therefore be correspondingly interpreted.

What is claimed is:

A conveyor truck, comprising a truck body, a rearwardly downwardly inclined bin mounted thereon, said bin having sides sloping inwardly downwardly, an air-permeable but powder-impermeable bottom in said bin, an air chamber underneath said air-permeable bottom, an air blower connected to said air chamber, an adjustable discharge gate at one end of said bin and adjacent the bottom thereof, a relatively short, substantially horizontal screw disposed at a lower level than said permeable bottom, a cylindrical housing enclosing said screw and of appreciably larger inside diameter than the outside diameter of said screw, a discharge chute connecting said adjustable gate and said housing, a vertical screw conveyor section communicating with said housing, a movable screw conveyor section attached to and communicating with the discharge end of said vertical screw conveyor section, and a final discharge spout at the down-stream end of said movable screw conveyor section, said movable screw conveyor section adapted to rotate in a vertical plane coincident with the longitudinal axis of said truck.

References Cited in the file of this patent

UNITED STATES PATENTS

| | | |
|---|---|---|
| 1,607,554 | Meyer | Nov. 16, 1926 |
| 2,119,071 | Capps | May 31, 1938 |
| 2,479,899 | Beyer | Aug. 23, 1949 |
| 2,481,860 | Miller | Sept. 13, 1949 |
| 2,545,766 | Cline | Mar. 20, 1951 |
| 2,585,169 | Potter | Feb. 12, 1952 |
| 2,589,968 | Schemm | Mar. 18, 1952 |
| 2,613,004 | Kane | Oct. 7, 1952 |
| 2,633,255 | Hoffstetter | Mar. 31, 1953 |
| 2,676,721 | Hansen | Apr. 27, 1954 |